US008891332B2

(12) United States Patent
Tonchia et al.

(10) Patent No.: US 8,891,332 B2
(45) Date of Patent: Nov. 18, 2014

(54) STEERABLE SOURCE SYSTEMS AND METHOD

(75) Inventors: Hélène Tonchia, Massy Cedex (FR); Frederic Simonnot, Massy Cedex (FR)

(73) Assignee: CGGVeritas Services SA, Massy Cedex (FR)

( * ) Notice: Subject to any disclaimer, the term of this patent is extended or adjusted under 35 U.S.C. 154(b) by 400 days.

(21) Appl. No.: 13/238,221

(22) Filed: Sep. 21, 2011

(65) Prior Publication Data
US 2013/0070557 A1    Mar. 21, 2013

(51) Int. Cl.
*G01V 1/38* (2006.01)
*B63B 21/66* (2006.01)

(52) U.S. Cl.
CPC ............ *G01V 1/3861* (2013.01); *G01V 1/3817* (2013.01); *B36B 21/66* (2013.01)
USPC .............................. 367/16; 114/244; 114/253

(58) Field of Classification Search
CPC .... G01V 1/3861; G01V 1/3826; B63B 21/66; B63B 21/663
USPC ................. 367/16–18; 114/244–253
See application file for complete search history.

(56) References Cited

U.S. PATENT DOCUMENTS

| | | | |
|---|---|---|---|
| 3,921,124 A | 11/1975 | Payton | |
| 4,087,780 A | 5/1978 | Itria et al. | |
| 4,323,989 A | 4/1982 | Huckabee et al. | |
| 4,506,352 A | 3/1985 | Brandsaeter | |
| 4,719,987 A | 1/1988 | George, Jr. et al. | |
| 4,748,599 A | 5/1988 | Gjestrum et al. | |
| 4,831,599 A | 5/1989 | Dragsund et al. | |
| 4,845,686 A | 7/1989 | Brac | |
| 4,862,422 A | 8/1989 | Brac | |
| 6,011,753 A | 1/2000 | Chien | |
| 6,606,958 B1 | 8/2003 | Bouyoucos | |
| 6,681,710 B2 | 1/2004 | Semb | |
| 7,415,936 B2 | 8/2008 | Storteig et al. | |
| 7,450,467 B2 * | 11/2008 | Tveide et al. ............ | 367/16 |
| 7,457,193 B2 | 11/2008 | Pamik | |
| 7,463,549 B2 | 12/2008 | Naess | |
| 7,466,632 B1 | 12/2008 | Sorli | |

(Continued)

FOREIGN PATENT DOCUMENTS

| | | |
|---|---|---|
| EP | 0 018 053 A1 | 10/1980 |
| GB | 2 400 662 B | 8/2006 |
| WO | 01/61380 A2 | 8/2001 |

OTHER PUBLICATIONS

Mexican Office Action dated May 16, 2014, in related Mexican Patent Application No. MX/a/2012/010963.

*Primary Examiner* — Ian J Lobo
(74) *Attorney, Agent, or Firm* — Patent Portfolio Builders PLLC

(57) ABSTRACT

A marine acoustic source system for generating an acoustic wave in a body of water. The marine acoustic source system includes a first marine acoustic source array having first and second external source sub-arrays, each sub-array including one or more individual source elements; a first actuator device connected to the first external source sub-array; and a first rope connecting the first actuator device to a first lead-in that is configured to connect to a head of a streamer. The first actuator device is configured to control a length of the first rope in order to control a position of the first source array relative to the streamer.

21 Claims, 13 Drawing Sheets

(56) References Cited

U.S. PATENT DOCUMENTS

| | | |
|---|---|---|
| 7,577,060 B2 | 8/2009 | Toennessen et al. |
| 7,738,317 B2 | 6/2010 | Toennessen |
| 7,804,738 B2 | 9/2010 | Storteig et al. |
| 2002/0064088 A1* | 5/2002 | Barker ............................ 367/20 |
| 2007/0019504 A1* | 1/2007 | Howlid et al. .................. 367/16 |
| 2007/0064526 A1 | 3/2007 | Holo |
| 2007/0247971 A1 | 10/2007 | Semb et al. |
| 2008/0279042 A1 | 11/2008 | Storteig et al. |
| 2008/0316859 A1 | 12/2008 | Welker et al. |
| 2009/0092005 A1 | 4/2009 | Goujon et al. |
| 2009/0141587 A1 | 6/2009 | Welker et al. |
| 2010/0135112 A1* | 6/2010 | Robertsson ..................... 367/16 |
| 2010/0149910 A1* | 6/2010 | Martin ............................ 367/17 |
| 2011/0149681 A1* | 6/2011 | Hovland et al. ................ 367/15 |

* cited by examiner

STEERABLE SOURCE SYSTEMS AND METHOD

BACKGROUND

1. Technical Field

Embodiments of the subject matter disclosed herein generally relate to methods and systems and, more particularly, to mechanisms and techniques for steering source systems while being towed in water by a vessel.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by the receiver 11 on the streamer 12. Based on the data collected by the receiver 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two cables or ropes 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes or cables 54. However, this configuration does not allow an accurate control of the plural individual source elements. In other words, a position of the source array 16 cannot be adjusted except by changing the positions of the deflectors 44.

Further, the presence of the deflectors 44 introduces a further control problem as the deflectors rely on hydrodynamic forces, e.g., lift, created by the motion through the water to pull the streamers 50 outwardly to maintain their separation relative to the vessel path during the survey. Thus, water currents or other environmental factors may affect the lift, determining the deflectors to move closer to each other. As such, the positions of the streamers 50 and the plural individual source elements 52 are affected by the positions of the deflectors.

As four-dimensional (4-D) geophysical imaging is becoming more desired today, controlling the position of the source array is important. 4-D geophysical imaging involves 3-D seismic surveys repeated over the same subsurface at different moments in time to determine changes in the geophysical structures of the subsurface. Thus, as the 3-D survey is repeated in time, sometimes after a few months or years, it is desirable that the sources being used to generate the seismic waves are located as closely as possible to the same locations as in the previous survey over the subsurface.

Thus, it is challenging with existing source technology to position various source arrays, at different moments in time, at the same locations given the cross-currents, wind, waves, shallow water and navigation obstacles that are currently encountered by vessels that perform the seismic surveys.

Accordingly, it would be desirable to provide systems and methods that provide steerable source arrays having the capability to be positioned at a desired location during towing underwater by a vessel.

SUMMARY

According to one exemplary embodiment, there is a marine acoustic source system for generating an acoustic wave in a body of water. The marine acoustic source system includes a first marine acoustic source array having first and second external source sub-arrays, each sub-array including one or more individual source elements and a cable connecting to a vessel; a first actuator device connected to the first external source sub-array; and a first rope connecting the first actuator device to a first lead-in that is configured to connect to the head of a streamer. The first actuator device is configured to control the length of the first rope in order to control a position of the first source array relative to the streamer.

According to another exemplary embodiment, there is a marine acoustic source system for generating an acoustic wave in a body of water. The marine acoustic source system includes first and second lead-ins configured to be towed by a vessel and to directly connect to streamers and not to deflectors; first and second source arrays, each including plural sub-arrays, each sub-array including one or more individual source elements; a first actuator device connected to the first source array; and a second actuator device connected to the second source array. The first actuator device has a first cable configured to connect to the first lead-in and the second actuator device has a second cable configured to connect to the second lead-in, such that positions of the first and second source arrays are controllable along a line substantially perpendicular to a path of the source system.

According to still another exemplary embodiment, there is a method for controlling the position of a marine acoustic source system that generates an acoustic wave in a body of water. The method includes a step of positioning a first source array for towing in water, and a step of activating a first actuator device connected to the first source array to increase or decrease the length of a first rope connected to a first lead-in. The first lead-in is connected to a streamer and not a deflector.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source array being towed by a vessel. However, the embodiments to be discussed next are not limited to this source array, but may be applied to other seismic elements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need a steerable source array. According to an exemplary embodiment, such steerable source arrays are configured to include at least an actuation device, mounted on the source array, which is capable of actuating a link to a lead-in to change the position of the source array in a plane substantially parallel with a surface of the water. The actuation device may be provided to modify the position of the entire source array or only a part of the source array, e.g., a sub-array or an individual source element. The actuation device may be a winch that is electrically driven. The actuation device may be configured to be driven by a control mechanism that is located on a towing vessel, a control mechanism that is provided on the source array, a combination of them, or to be manually driven. The link of the actuation device is configured to connect to a lead-in that is configured to attach to a head of a streamer. The connection to the lead-in may be fixed or movable, e.g., via a slider.

Figure 1:
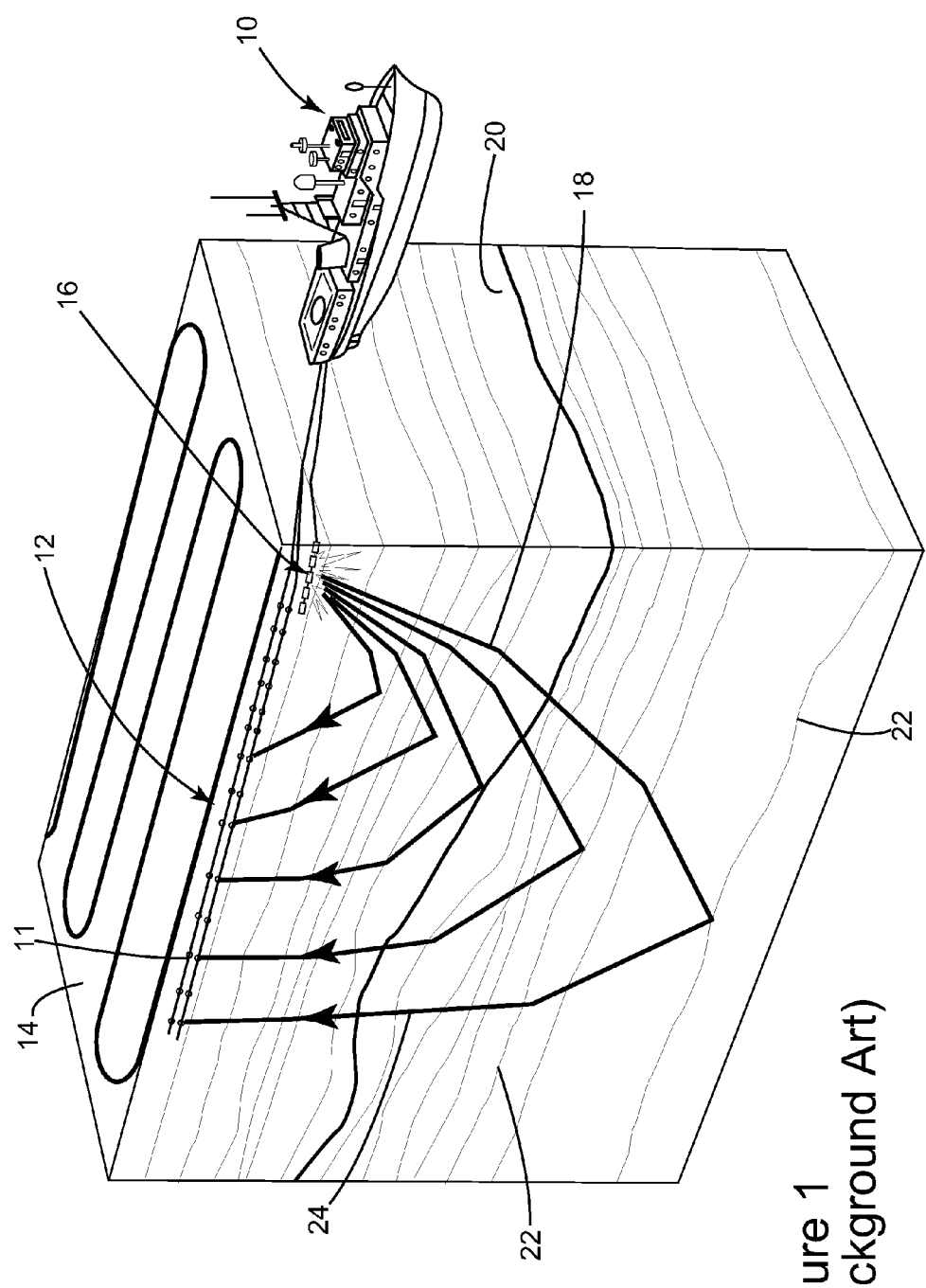
FIG. 1 is a schematic diagram of a conventional seismic survey system.
Figure 2:
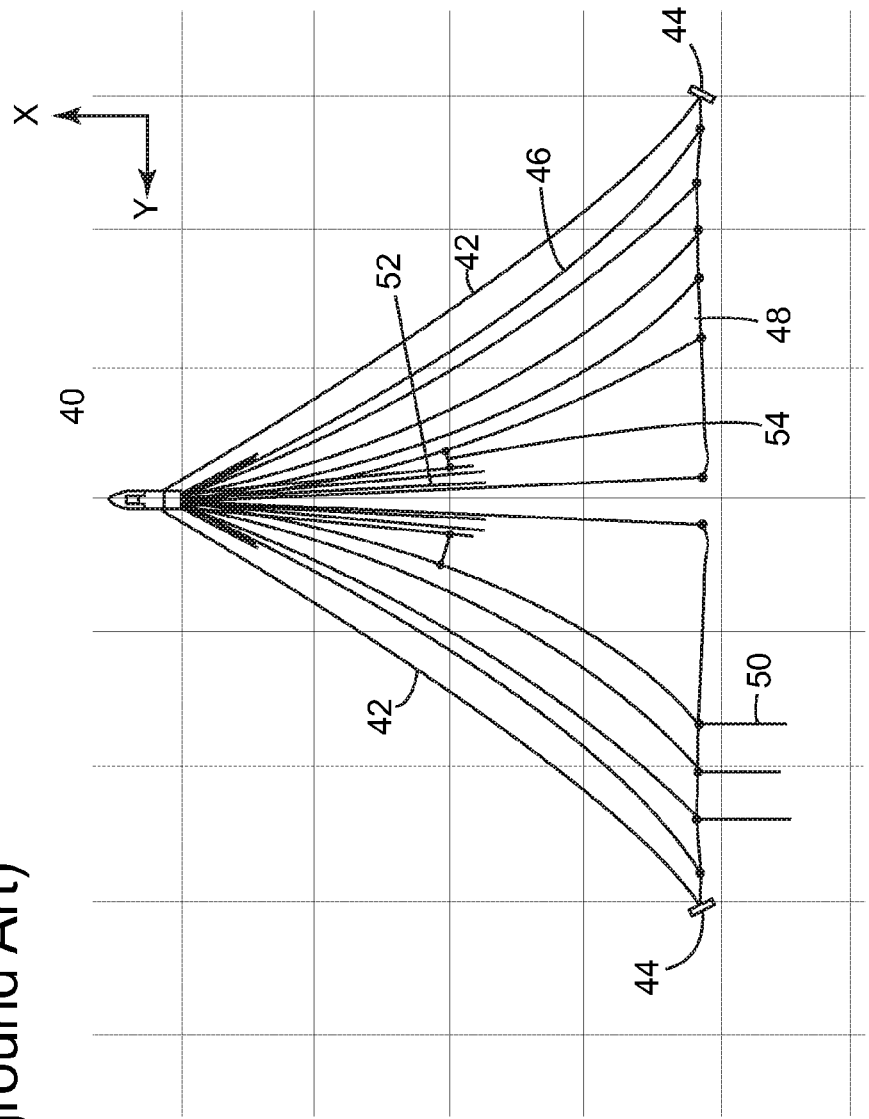
FIG. 2 illustrates a traditional arrangement of a source array that is towed by a vessel.
Figure 3:
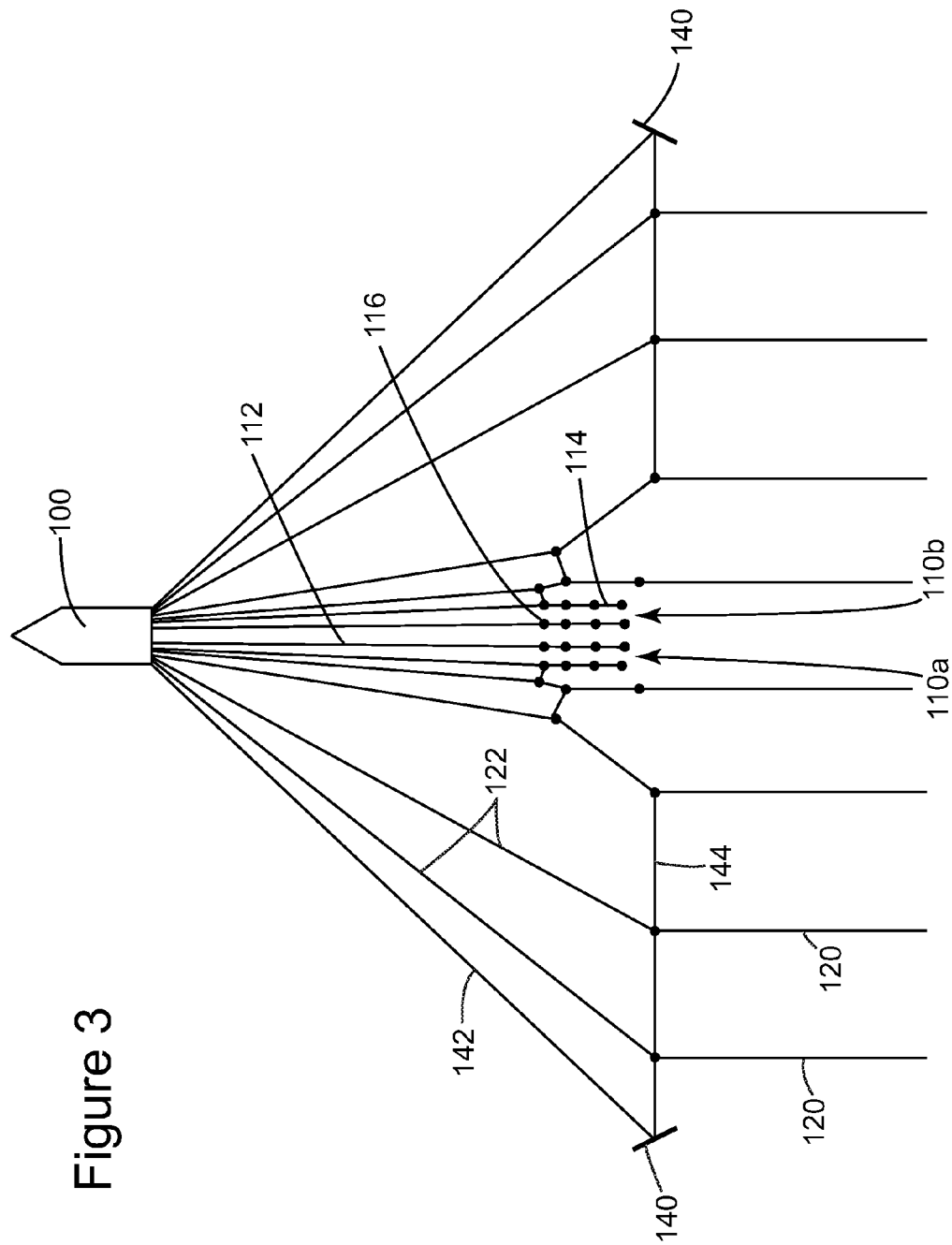
FIG. 3 illustrates an arrangement of steerable source arrays and plural streamers according to an exemplary embodiment.

According to an exemplary embodiment illustrated in FIG. 3, a vessel 100 tows two source arrays 110a and 110b (it is also possible to tow only one source or more than two sources but, for simplicity, the novel features are discussed with regard to two source arrays) and plural streamers 120. The streamers 120 are connected to the vessel through lead-ins 122 while the source arrays 110a and 110b are connected through cables 112 to the vessel 100. Each source array 110a or 110b may include sub-arrays 114, each sub-array having plural individual source elements 116. Deflectors 140 are provided on the sides of this arrangement to maintain a transverse distance (relative to the path of the vessel) between the streamers 120. The deflectors 140 are connected to the vessel 100 via wide tow cables 142, and spread ropes or cables 144 are used to separate the streamers from each other. It is noted that the terms "rope" and "cable" and "wire" are used sometimes interchangeably in this document. Thus, these terms should not be construed in a narrow sense but rather as those skilled in the art would expect. The number of streamers or individual source elements is exemplary and not intended to limit the applicability of the novel concepts.

Figure 4:
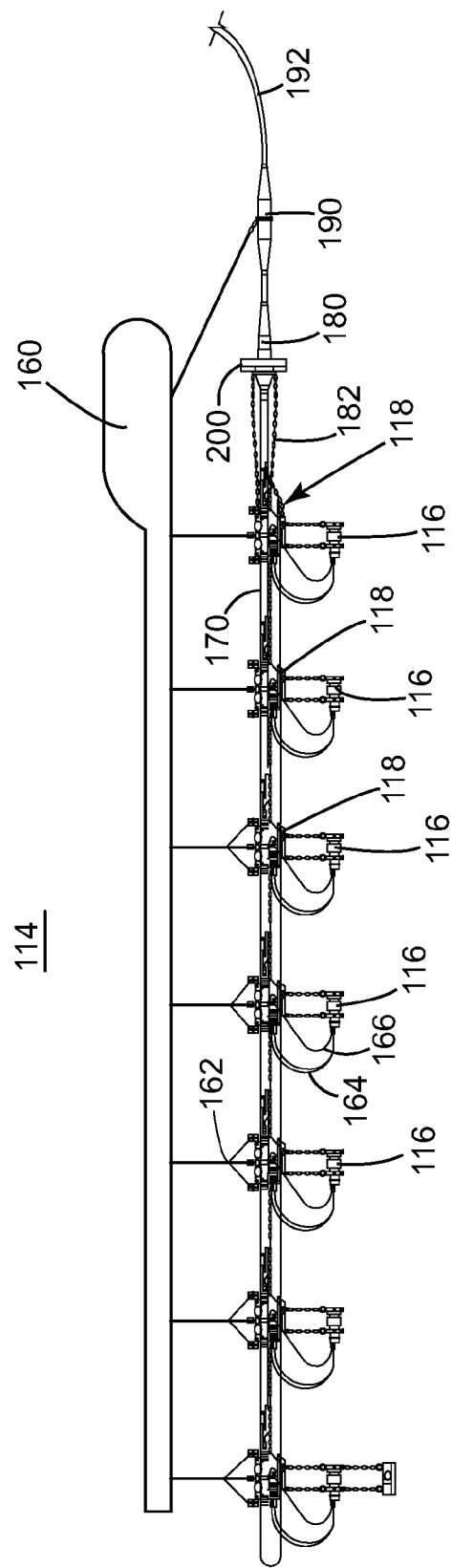
FIG. 4 is a schematic diagram of a steerable source array according to an exemplary embodiment.

A single sub-array 114 is shown in FIG. 4. The sub-array 114 includes one or more floats 160 from which the individual source elements 116 are suspended with cables or ropes 162. In one application, clusters of individual source elements are provided at the location 116. Various cables connect the individual source elements 116 to the vessel for providing electric power, compressed air, data transmission, etc. For example, a cable 164 provides the compressed air and a cable 166 provides electric power and/or data transmission.

Source bases 118 are connected to each other via links 170 and also to a bell housing 180 via a connection 182. In one application, the links 170, bell housing 180 and the connection 182 may form an enclosure in which the various cables 164 and 166 are entering. The bell housing 180 may be made of a resistant material, for example, stainless steel. A bend restrictor device 190 may be connected to the bell housing 180 and also to the vessel 100 via an umbilical 192. The bend restrictor device 190 is configured to prevent an over-bending of the front part of the source array due to the towing force applied via the umbilical 192. The bend restrictor device 190 may also be made of a resistant material. In one application, the bell housing 180 may be directly connected to the umbilical 192.

Figure 5:
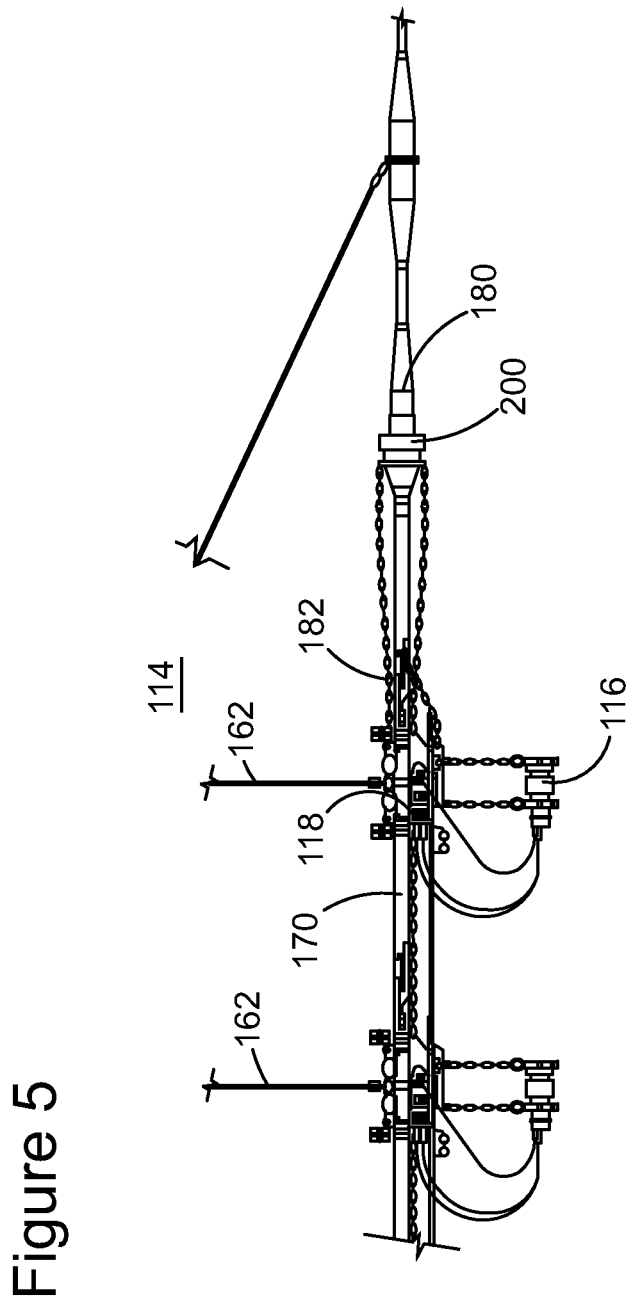
FIG. 5 is a schematic diagram of a front portion of a steerable source sub-array according to an exemplary embodiment.

An actuator device 200 may be attached to a side of the bell housing 180 as shown in FIG. 5. Electrical and/or data cables are provided from the bell housing 180 to the actuator device 200 for instructing the actuator device to retrieve or release a corresponding cable and for providing electrical energy to a motor of the actuator device. Electrical energy may be provided from the vessel or from a battery (not shown) installed at the source array, for example, in the bell housing.

Figure 6:
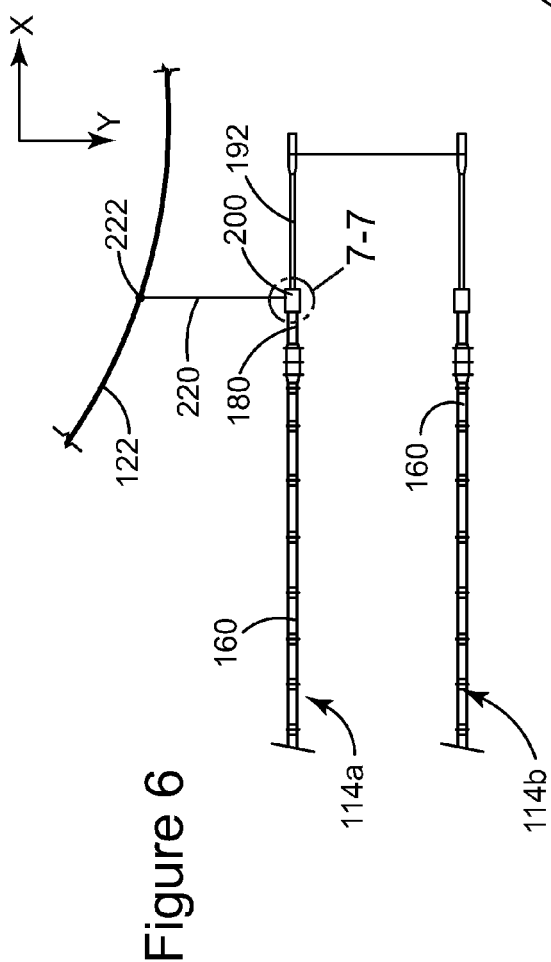
FIG. 6 is a top view of two sub-arrays having an actuation device according to an exemplary embodiment.
Figure 7:
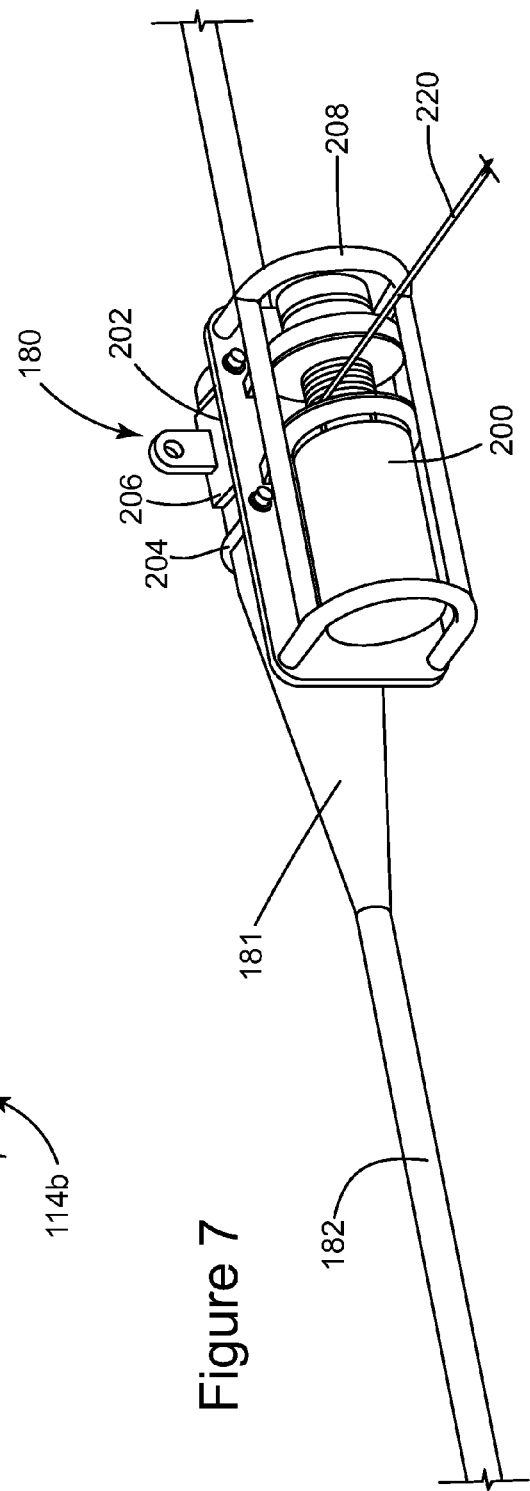
FIG. 7 is close view of the actuation device as attached to a sub-array according to an exemplary embodiment.

A top view of two sub-arrays 114a and 114 is shown in FIG. 6. It is noted that only two sub-arrays are shown for simplicity. In practical applications, more than two sub-arrays may be present. A lead-in 122 is also shown next to sub-array 114a. The actuator device 200 is connected to a side of the bell housing 180 of the array 114a. In FIG. 6, a cable 220 is shown extending from the actuator device 200 to the lead-in 122. A more detailed view of the actuator device 200, cable 220 and the bell-housing 180 are shown in FIG. 7. The actuator device 200 may be a winch that is attached, for example, to a base plate 202. The base plate 202 is connected by curved bolts 204 and screws 206 to the bell housing 180. Other methods for connecting the winch to the bell housing may be used. FIG. 7 also shows the bell housing 180 connected to the connection (or umbilical) 182 via an intermediate piece 181. For example, this intermediate piece 181 may be made of polyurethane and thus has a bending property. In one application, the actuator device 200 may be attached to the bend restrictor device 190 instead of the bell housing 180.

Returning to FIG. 6, it is noted that cable 220 may be either fixed to the lead-in 122 or may be provided with a slider 222 that can move freely along the cable 220. The slider 222 may include, for example, a pulley. Thus, the cable 220 may be maintained substantially perpendicular on the sub-array 114a as the length of the cable 220 is adjusted by the actuator device 200.

Figure 8:
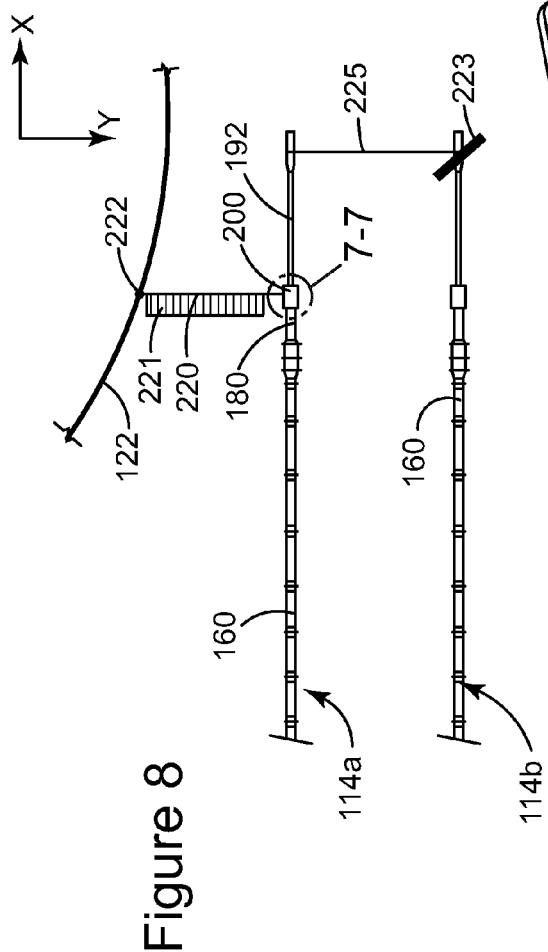
FIG. 8 is a schematic diagram of a two sub-arrays having a fairing attached to a cable according to an exemplary embodiment.

According to an exemplary embodiment illustrated in FIG. 8, the cable 220 may be provided with a fairing 221. Such a fairing improves the drag when the cable 220 is towed underwater. FIG. 8 also shows the addition of a deflector 223 on a head portion of the sub-array 114b. Deflector 223 is intended to stretch the cable 220 and/or cable 225 (connecting two sub-arrays to each other) when the winch 200 winds out cable 220.

Figure 9:
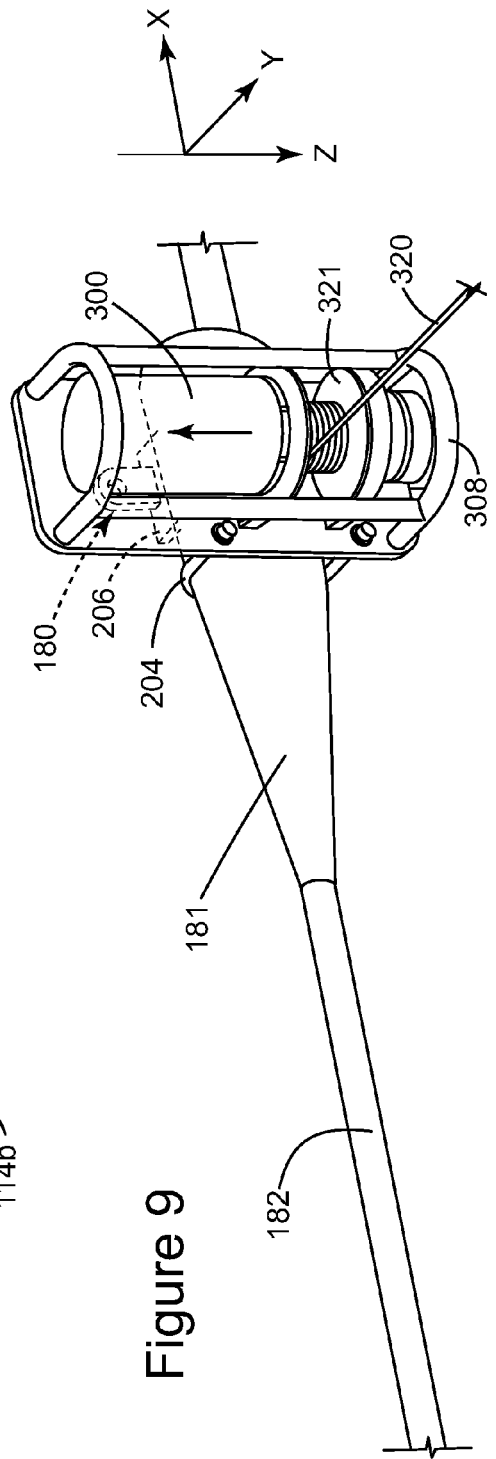
FIG. 9 is a schematic diagram of a vertical actuation device attached to a source array according to an exemplary embodiment.

According to another exemplary embodiment illustrated in FIG. 9, a winch 300 is mounted to the bell housing 180 so that a longitudinal axis A of the winch is substantially parallel to a Z axis instead of an X axis. This vertical positioning of the winch 300 has the advantage that friction between rope 320 and sides 321 of the spool of the winch are reduced because the rope 320 mainly moves in the plane XY.

Figure 10:
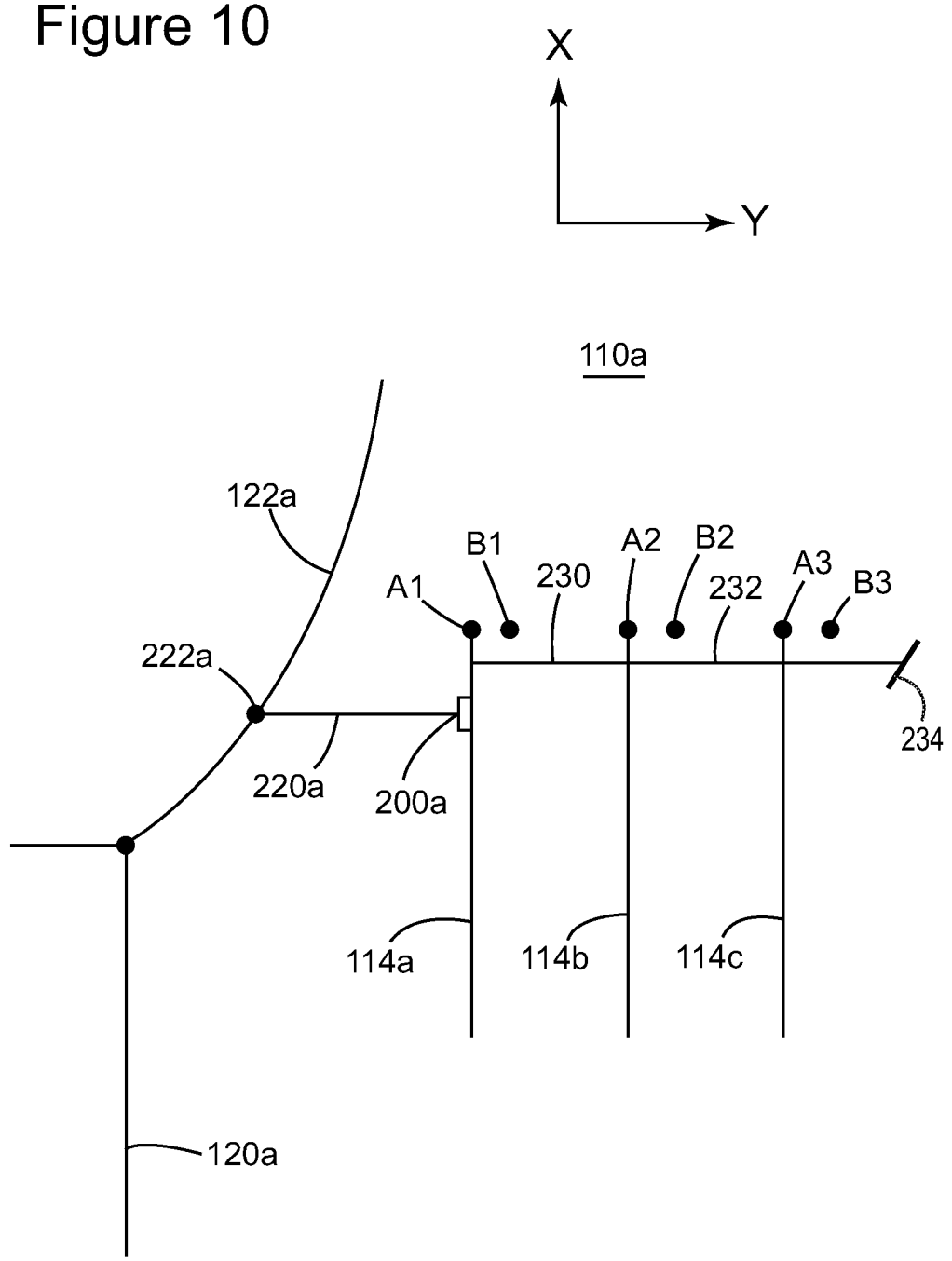
FIG. 10 is a schematic diagram of a source array having an actuation device according to an exemplary embodiment.

When in operation, supposing that the lead-in cable 122 is at a desired position, the position of the sub-array 114a along the Y axis (cross-line) may be adjusted as desired. In other words, the vessel is towing the source arrays along the X axis in FIG. 6, and the position of each source array can be adjusted along the cross-line, which is substantially perpendicular on the towing direction and substantially in the plane of the water surface. More specifically, FIG. 10 shows a source array 110a having three sub-arrays 114a-c provided next to a lead-in 122a. The lead-in 122a is attached to a streamer 120a. Cables or ropes 230 and 232 connect the sub-arrays to each other and ensure that the distance between the sub-arrays along the Y axis cannot exceed a given length. The length of the cables 230 and 232 is fixed. In this exemplary embodiment, the actuation device 220a is provided only at the sub-array 114a but not to other sub-arrays of the source array 110a. The same is true for another source array 110b (shown in FIG. 3), i.e., a single actuation device (not shown) is provided to a single sub-array of a source array, next to a corresponding lead-in (not shown). The number of sub-arrays shown in the figure is illustrative. More than three sub-arrays may be used. A deflector 234 may be connected via a cable 236 to sub-array 114c so that the sub-arrays 114a-c are stretched irrespective of the length of the rope 220a. In one application, the deflector 234 is configured to only stretch the sub-arrays and not to steer them.

When desired to change the positions of the sub-arrays 114a-c from positions A1-A3 to B1-B3 (for example, relative to a streamer 120), the control system instructs the actuation device 200a to release or retract the corresponding rope 220a. Thus, according to this exemplary embodiment, the position of the entire source array 110a (i.e., all the sub-arrays) may be changed by actuating a single actuator device. Also, in another application, the lead-ins to which the ropes of the actuator devices are attached are not configured to support deflectors 140 as shown in FIG. 3, but rather streamers 120 as shown in FIG. 10.

This specific arrangement is believed to better allow the operator of the survey to control the relative positions of the streamers and sources because the position of a deflector may negatively affect the position of the source arrays. Thus, this arrangement eliminates the deflectors for positioning the source arrays and also eliminates the inaccuracies introduced by the deflectors.

Figure 11:
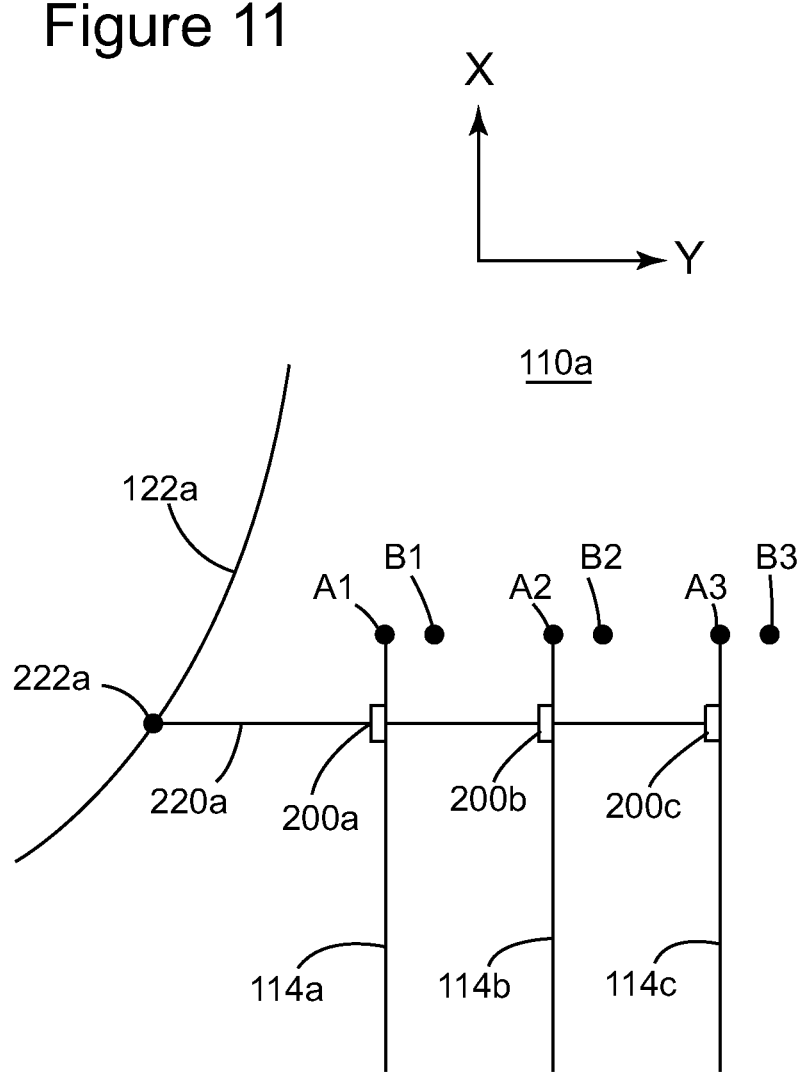
FIG. 11 is a schematic diagram of a source array having plural actuation devices according to an exemplary embodiment.

According to another exemplary embodiment illustrated in FIG. 11, it is possible that each sub-array 114a-c has its own actuator device 200a-c, respectively. In this situation, there are no cables 230 and 232 to maintain a constant distance between the sub-arrays. However, under this scenario, the position of each sub-array can be adjusted relative to an adjacent sub-array or relative to another desired reference point. In other words, while the embodiment illustrated in FIG. 10 has the capability to control the position of the entire source array 110a relative to a given reference, according to the present embodiment the position of each sub-array 114a-c may be controlled relative to the same given reference, in addition to the entire position of the source array 110a.

Figure 12:
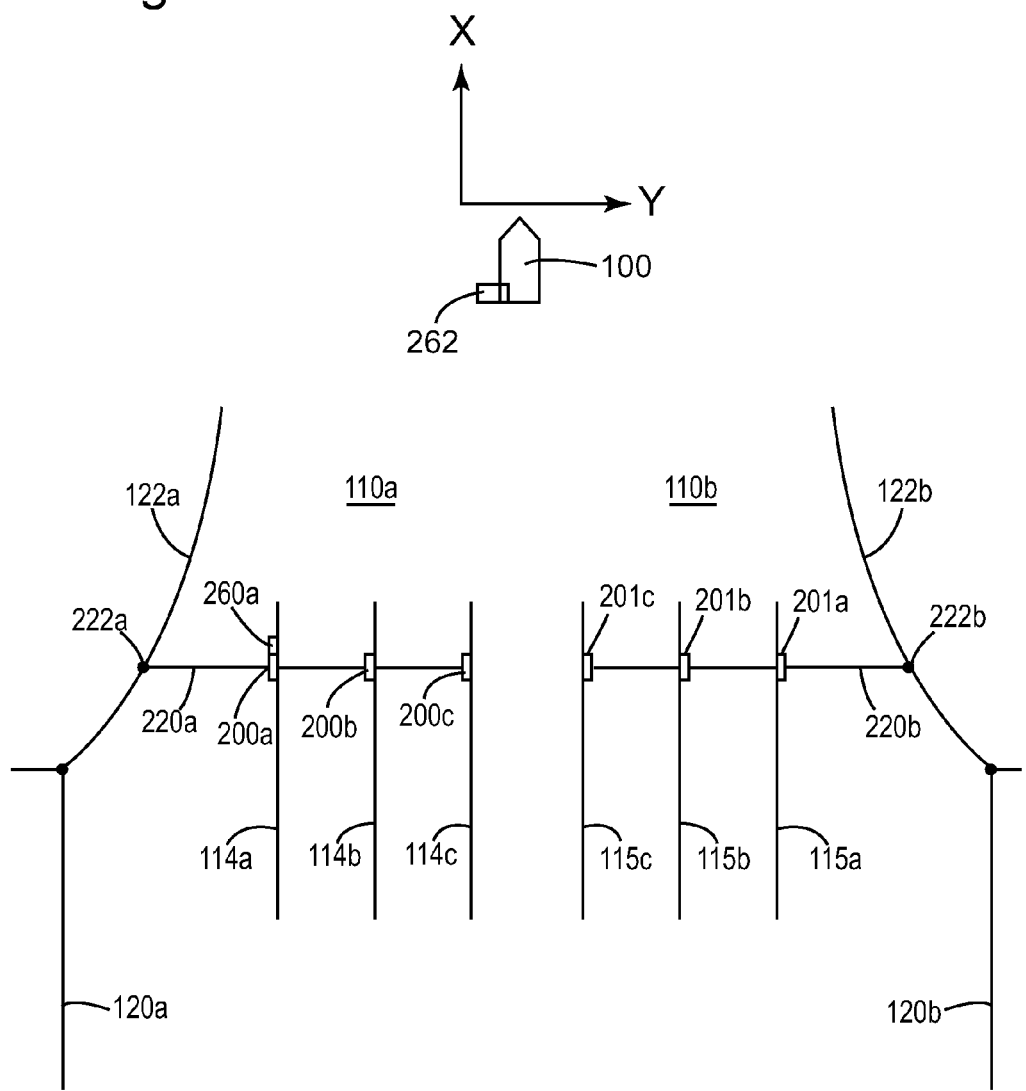
FIG. 12 is a schematic diagram of two source arrays having actuation devices according to an exemplary embodiment.

As for the embodiment shown in FIG. 10, the marine source system of the present embodiment may include two or more source arrays. In one application, two source arrays are towed by the vessel. If two source arrays are provided, the configuration of the second source array mirrors the configuration of the first source array 110a, and the second source array 110b attaches to a corresponding lead-in 122b as shown in FIG. 12. FIG. 12 shows sub-arrays 115a-c and corresponding actuator devices 201a-c similar to those of the source array 110a. It is noted that although FIG. 12 shows each sub-array of the source arrays having an actuator device, the marine source system having two source arrays may include only one actuator device per source array.

With regard to the second source array 110b, a rope 220b connects the actuator device 201 a to a lead-in 112b. The lead-in 122b is connected to a corresponding streamer 120b and not to a deflector. In this application, the positions of each source array 110a or 110b are independently controlled from each other.

To control the actuation devices for the above noted configurations, it is possible to have an individual control mechanism for each actuation device and/or a central control mechanism. For example, as shown in FIG. 12, the actuation device 200a may have its own local control mechanism 260a that may be programmed to maintain a certain position of the corresponding sub-array 114a. In another application, the local control mechanism 260a communicates (wired or wireless) with a central control mechanism 262 situated on the towing vessel 100 in order to receive the position coordinates for the source array and/or sub-arrays. Thus, the central control mechanism 262 may be configured to instruct the local control mechanism 260a with regard to when and how long to activate the actuation device.

Figure 13:
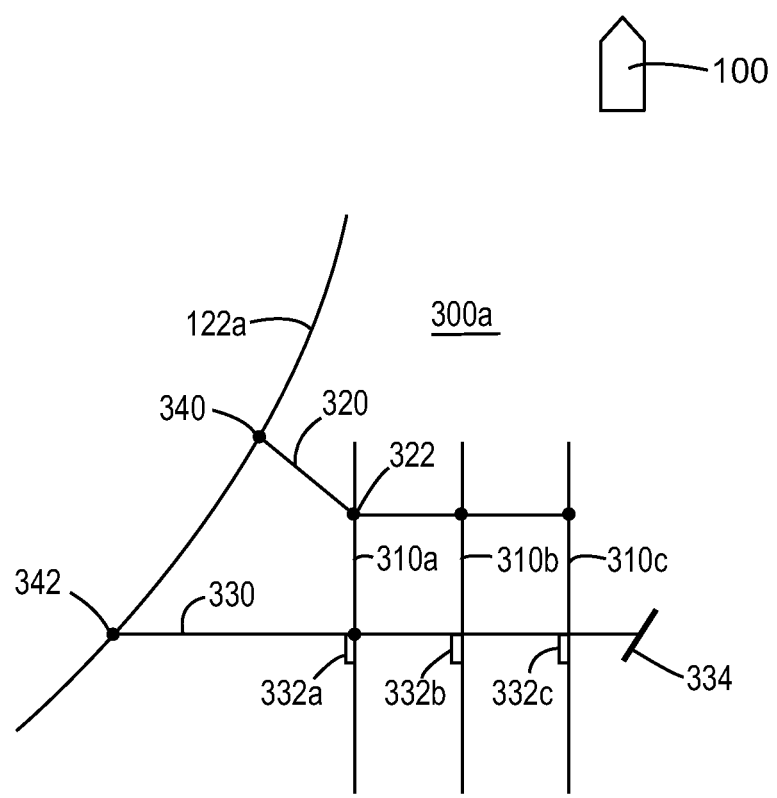
FIG. 13 is a schematic diagram of a source array having multiple connections to a lead-in according to an exemplary embodiment.

According to still another exemplary embodiment illustrated in FIG. 13, a source array 300a that includes plural sub-arrays 310a-c may be connected at more than one point to a corresponding lead-in 122a. For example, the sub-arrays 310a-c are connected at two different points to the lead-in 122a. A first rope 320 fixedly connects to a point 322 of the first sub-array 310a and a second rope 330 connects to an actuator device 332*a* that is attached to the sub-array 310*a*. The other end of the first rope 320 may be attached to a slider 340 that is free to slide along the lead-in 122*a*. Similarly, the other end of the second rope 330 may be attached to a slider 342 that is free to slide along the lead-in 122*a*. A deflector 334 may be attached to sub-array 310*c* to stretch all the sub-arrays independent of the length of the second rope 330.

The source array 300*a* may include more than one actuator device, for example, one for each sub-array. According to another exemplary embodiment, an actuator device may be provided to point 322 to control the length of the first rope 320. The configurations discussed with regard to FIG. 13 may be replicated to a second source array (not shown) that attaches to a corresponding lead-in (not shown), similar to the configuration shown in FIG. 12.

Figure 14:
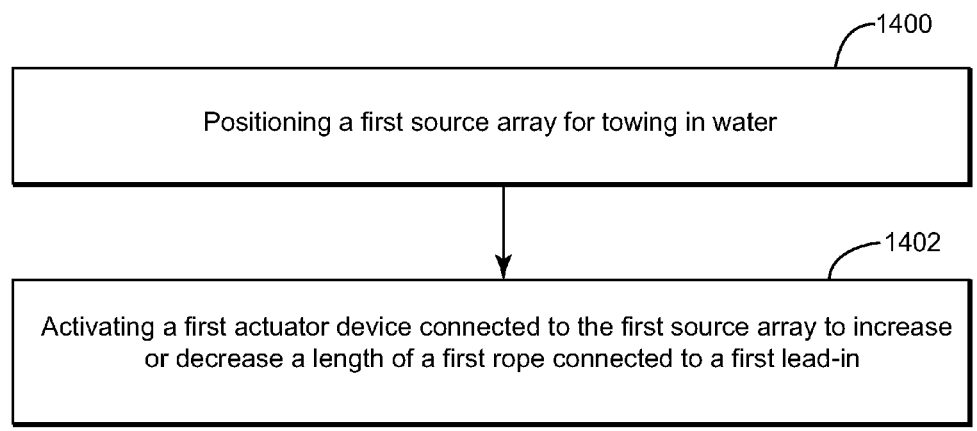
FIG. 14 is a flow chart of a method for steering a source array according to an exemplary embodiment.

According to an exemplary embodiment illustrated in FIG. 14, there is a method for controlling the position of a marine acoustic source system (110*a*, 110*b*) that generates an acoustic wave in a body of water. The method includes a step 1400 of positioning a first source array (110*a*) for towing in water; and a step 1402 of activating a first actuator device (200*a*) connected to the first source array (110*a*) to increase or decrease the length of a first rope (220*a*) connected to a first lead-in (122*a*). It is noted that the first lead-in (122*a*) is connected to a streamer and not a deflector.

Figure 15:
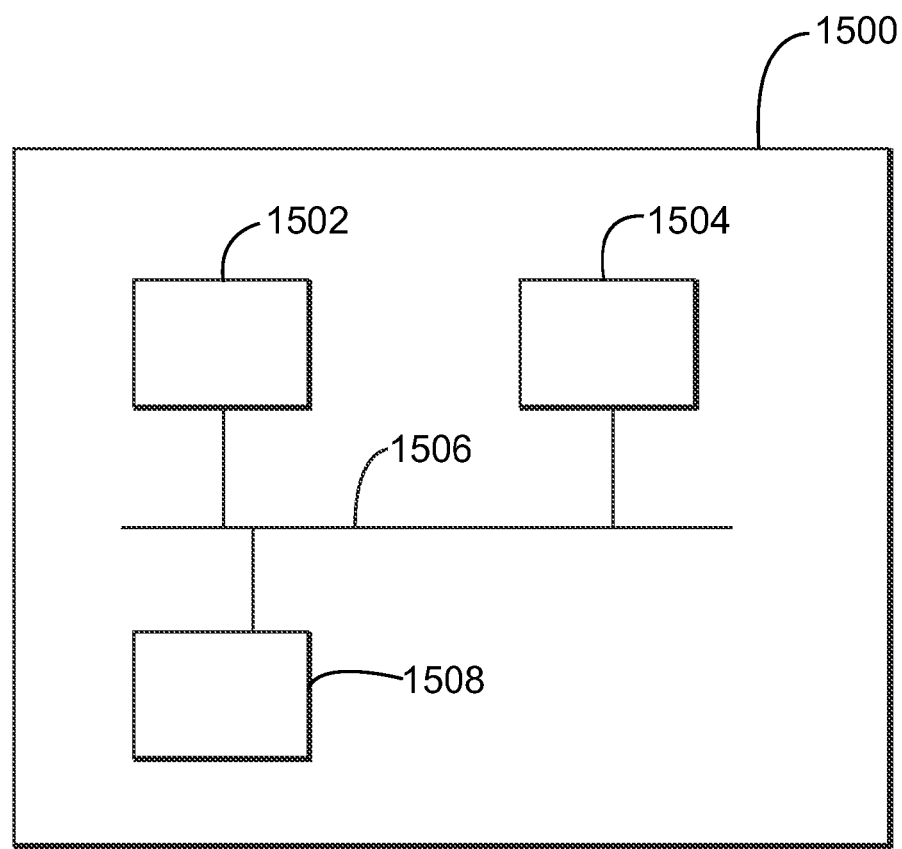
FIG. 15 is a schematic diagram of a controller for steering the source array.

With regard to the local and/or central controllers discussed above, a possible configuration of such a device is schematically illustrated in FIG. 15. Such a controller 1500 includes a processor 1502 and a storage device 1504 that communicate together via a bus 1506. An input/output interface 1508 also communicates with the bus 1506 and allows an operator to communicate with the processor or the memory, for example, to input software instructions for operating the actuator devices. The input/output interface 1508 may also be used by the controller to communicate with other controllers or interfaces that are provided on the vessel. For example, the input/output interface 1508 may communicate with a GPS system (not shown) for acquiring the actual position of the source array or with an acoustical system for acquiring actual positions of the independent source elements of the source array. The controller 1500 may be a computer, a server, a processor or dedicated circuitry.

One or more of the exemplary embodiments discussed above provide a source array having a position that may be controlled along a line substantially perpendicular to the travel path of a vessel towing the source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine acoustic source system for generating an acoustic wave in a body of water, the marine acoustic source system comprising:
    a first marine acoustic source array having first and second external source sub-arrays, each sub-array including one or more individual source elements and a cable connecting to a vessel;
    a first actuator device located on the first external source sub-array; and
    a first rope connecting the first actuator device to a first lead-in that is configured to connect to a head of a streamer,
    wherein the first actuator device is configured to control a length of the first rope in order to control a position of the first source array relative to the streamer.

2. The marine acoustic source system of claim 1, wherein the first lead-in is configured to directly connect to a head of the streamer and not to directly connect to a deflector.

3. The marine acoustic source system of claim 1, further comprising:
    an internal sub-array sandwiched between the first external sub-array and the second external sub-array and configured to have a second actuation device that connects with a second rope to the first external sub-array.

4. The marine acoustic source system of claim 3, further comprising:
    a third actuator device provided on the second external sub-array and having a third rope that connects to the internal sub-array.

5. The marine acoustic source system of claim 4, further comprising:
    a local control mechanism provided at the first actuation device and configured to actuate the first actuator device; or
    a central control mechanism provided on a towing vessel and configured to actuate the first actuator device.

6. The marine acoustic source system of claim 1, further comprising:
    a first slider connected to the first rope of the first actuator device and configured to roll on the first lead-in.

7. The marine acoustic source system of claim 1, wherein the first actuator device is connected to a side of a bell housing of the first external sub-array, wherein the bell housing is a rigid structure, or the first actuator is connected to a bend restrictor provided in front of the bell housing.

8. The marine acoustic source system of claim 1, wherein the first actuator device is a winch electrically actuated with electrical energy provided from a vessel that tows the source system or from a battery located on the source system.

9. The marine acoustic source system of claim 1, further comprising:
    a deflector connected to the second external source sub-array and configured to maintain a distance between the first and second external source sub-arrays substantially constant when a length of the first rope varies.

10. The marine acoustic source system of claim 9, wherein each sub-array includes a corresponding actuator device and each actuator device has a corresponding rope that connects to an adjacent sub-array or lead-in.

11. The marine acoustic source system of claim 1, further comprising:

a second rope fixedly connected with one end to the first sub-array and movably connected with the other end to a slider, where in the slider is configured to freely move along the first lead-in.

12. The marine acoustic source system of claim 1, further comprising:
a fairing provided on the first rope.

13. The marine acoustic source system of claim 1, further comprising:
an internal sub-array provided adjacent to the first external sub-array and connected with a cable to the first external sub-array; and
a deflector attached to a head of the internal sub-array.

14. The marine acoustic source system of claim 1, wherein the first actuator device has a rotating spool configured to rotate about an axis that extends substantially along the first external sub-array or the axis is substantially perpendicular to the first external sub-array.

15. A marine acoustic source system for generating an acoustic wave in a body of water, the marine acoustic source system comprising:
first and second lead-ins configured to be towed by a vessel and to directly connect to streamers and not to deflectors;
first and second source arrays, each including plural sub-arrays, each sub-array including one or more individual source elements;
a first actuator device located on the first source array; and
a second actuator device connected to the second source array,
wherein the first actuator device has a first cable configured to connect to the first lead-in and the second actuator device has a second cable configured to connect to the second lead-in such that positions of the first and second source arrays are controllable along a line substantially perpendicular to a path of the source system.

16. The marine acoustic source system of claim 15, further comprising:
an internal sub-array sandwiched between first and second external sub-arrays of the first source array and configured to have an actuation device.

17. The marine acoustic source system of claim 16, further comprising:
a local control mechanism provided at the first actuation device of the first source array and configured to control the first actuation device; or
a central control mechanism provided on a towing vessel and configured to control the first actuation device.

18. The marine acoustic source system of claim 15, further comprising:
a first slider connected to the first rope of the first actuator device of the first source array and configured to roll along the first lead-in; and
a second slider connected to the second rope of the second actuator device of the second source array and configured to roll along the second lead-in.

19. The marine acoustic source system of claim 15, wherein the first actuator device is a winch electrically actuated with electrical energy provided from a vessel that tows the source system or from a battery located on the source system.

20. The marine acoustic source system of claim 15, further comprising:
a second rope fixedly connected with one end to a first sub-array of the first source array and movably connected with the other end to a slider, wherein the slider is configured to freely move along the first lead-in.

21. A method for controlling a position of a marine acoustic source system that generates an acoustic wave in a body of water, the method comprising:
positioning a first source array for towing in water; and
activating a first actuator device located on the first source array to increase or decrease a length of a first rope connected to a first lead-in, wherein the first lead-in is connected to a streamer and not a deflector.

* * * * *